(12) United States Patent
Vink et al.

(10) Patent No.: US 10,867,443 B2
(45) Date of Patent: Dec. 15, 2020

(54) INFORMATION TRANSFORMATION IN DIGITAL PATHOLOGY

(71) Applicant: KONINKLIJKE PHILIPS N.V., Eindhoven (NL)

(72) Inventors: Jelte Peter Vink, Eindhoven (NL); Ruud Vlutters, Eindhoven (NL); Anke Pierik, Eindhoven (NL); Bas Hulsken, Eindhoven (NL); Reinhold Wimberger-Friedl, Eindhoven (NL); Sieglinde Neerken, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 42 days.

(21) Appl. No.: 15/745,049

(22) PCT Filed: Jul. 12, 2016

(86) PCT No.: PCT/EP2016/066540
§ 371 (c)(1),
(2) Date: Jan. 15, 2018

(87) PCT Pub. No.: WO2017/009337
PCT Pub. Date: Jan. 19, 2017

(65) Prior Publication Data
US 2018/0225872 A1    Aug. 9, 2018

(30) Foreign Application Priority Data
Jul. 16, 2015    (EP) .................................... 15176980

(51) Int. Cl.
*G06K 9/00*    (2006.01)
*G06T 19/00*    (2011.01)
(Continued)

(52) U.S. Cl.
CPC ............ *G06T 19/00* (2013.01); *G06T 7/0012* (2013.01); *G06T 7/11* (2017.01); *G06T 7/30* (2017.01);
(Continued)

(58) Field of Classification Search
None
See application file for complete search history.

(56) References Cited

U.S. PATENT DOCUMENTS 5,828,774 A * 10/1998 Wang ........................ G06T 5/50
382/128
2003/0179445 A1 * 9/2003 Maenle .................... G01N 1/30
359/368

(Continued)

FOREIGN PATENT DOCUMENTS

WO    WO0237158 A2    5/2002
WO    WO2014054016 A1    4/2014
(Continued)

OTHER PUBLICATIONS

Adey, Nils et al "A Mill Based Instrument and Software System for Dissecting Slide-mounted Tissue That Provides Digital Guidance and Documentation", BMC Clinical Pathology, Medscape 2013.
(Continued)

*Primary Examiner* — Hadi Akhavannik
(74) *Attorney, Agent, or Firm* — Sherry Austin

(57) ABSTRACT

The present invention relates to an illustration of an annotation (22) at a sample slide (14). It is the intention for the invention to copy the annotation (22) provided at a reference slide (12) to the sample slide (14). Typically, a reference image (26) of the reference slide (12) is provided, in particular by scanning the reference slide (12). The reference image (26) therefore has the information about a reference slice (16) which is carried by the reference slide (12).
(Continued)

Furthermore, the reference slide (12) has been marked with a region of interest (20) and the annotation (22), which can be associated with the region of interest (20). If such reference slide (12) is scanned, the respective reference image (26) comprises the information about the marked region of interest (20) as well as the annotation (22), too. Furthermore, the sample slide (14) carrying a sample slice (18) can be scanned, in order to provide a sample image (28). The sample slice (18) and the reference slice (16) are cut from the same object (10) of a biological material. In particular, the sample slice (16) has been cut directly after a cut of a material block has been preformed to provide the reference slice (18). Since the reference slice (16) and the sample slice (18) are from the same object (10), their features are very likely that the reference image (26) and the sample image (28) are very similar. Due to this similarity, the annotation (22) of the reference slide (12) is copied on a basis of an image recognition between reference image (26) and the sample image (28) to the sample slide (14).

16 Claims, 12 Drawing Sheets

(51) Int. Cl.
*G06T 7/00* (2017.01)
*G06T 11/00* (2006.01)
*G06T 7/30* (2017.01)
*G06T 7/11* (2017.01)
*G06T 7/33* (2017.01)

(52) U.S. Cl.
CPC .............. *G06T 7/337* (2017.01); *G06T 11/00* (2013.01); *G06T 2200/24* (2013.01); *G06T 2207/20104* (2013.01); *G06T 2207/30024* (2013.01); *G06T 2207/30096* (2013.01); *G06T 2207/30204* (2013.01); *G06T 2219/004* (2013.01)

(56) References Cited

U.S. PATENT DOCUMENTS

| | | |
|---|---|---|
| 2004/0085443 A1* | 5/2004 | Kallioniemi .............. G01N 1/36 348/135 |
| 2011/0019914 A1* | 1/2011 | Bimber ................ G02B 21/367 382/167 |
| 2012/0045790 A1* | 2/2012 | Van Dijk .............. G06T 7/0014 435/29 |
| 2012/0076390 A1* | 3/2012 | Potts ..................... G06T 7/0014 382/133 |
| 2013/0169788 A1 | 7/2013 | Tsuji |
| 2015/0262329 A1 | 9/2015 | Vink |
| 2016/0267656 A1 | 9/2016 | Van Leeuwen |

FOREIGN PATENT DOCUMENTS

| | | |
|---|---|---|
| WO | 2014140070 A2 | 9/2014 |
| WO | WO2014140070 A2 | 9/2014 |
| WO | 2015049233 A1 | 4/2015 |
| WO | 2015052128 A1 | 4/2015 |

OTHER PUBLICATIONS

Shi, Chen et al "Inexpensive Monocular Pico-Projector-based Augmented Reality Display for Surgical Microscope", Proc. IEEE Int Symp Comput Based Med Syst. 2012.

Lowe, David G. "Distictive Image Features from Scale-Invariant Keypoints", International Journal of Computer Vision, vol. 60, No. 2, 2004.

Written Opinion of the International Preliminary Examining Authority, PCT/EP206/066540, dated May 26, 2017.

EP16738751.3 Annex to the communication dated Jan. 13, 2020. Observations on the PCT International Search Report and the Written Opinion of International Application No. PCT/EP2016/066540, dated Dec. 15, 2017.

\* cited by examiner

INFORMATION TRANSFORMATION IN DIGITAL PATHOLOGY

CROSS-REFERENCE TO PRIOR APPLICATIONS

This application is the U.S. National Phase application under 35 U.S.C. § 371 of International Application No. PCT/EP2016/066540, filed on Jul. 12, 2016, which claims the benefit of European Patent Application No. 15176980.9, filed on Jul. 16, 2015. These applications are hereby incorporated by reference herein.

FIELD OF THE INVENTION

The invention relates to the digital pathology, and relates in particular to the transformation of an annotation between slides carrying slices of biological material.

BACKGROUND OF THE INVENTION

A pathologist has a central role in the diagnostic part of a care cycle. When a biologic material sample is taken from a patient during biopsy, it is usually the pathologist who makes the final diagnosis as to the nature and the gravity of a potential disease by microscopic inspection of the tissue and cells from the biopsy.

In an example, a slide for the microscopic inspection can be prepared in several steps as follows. First, the biological material sample can be placed in formalin for fixation and subsequently processed into a paraffin block, from which thin, about 5 µm, slices are cut. One of these slices is then placed on a substrate of the slide, in particular on a glass substrate, after which one or more staining substances can be applied, such that relevant cell or tissue parts are visible with the microscope. Thereafter, a matching fluid and/or a fixative can be added to the slice. Further, a thin, about 170 µm, transparent cover slip can be placed on top of the slice, such that the slice is sealed. This enables a long-term storage, in particular more than 10 years, of the slide including the slice.

Although pathology is typically an analog profession, there has been recently a move towards digital pathology, in order to improve the diagnostic efficiency and quality. Digital pathology refers to a digitalization of the information needed, for analyzing a biological material, in particular a slice, in the field of biology, histology and/or pathology. In particular, digital pathology refers to a digital molecular diagnostic of slices, which have been previously cut from a biological material sample.

An exemplary adaptation of the digital pathology would result in the pathologist handling the slides no longer himself physically, but instead to work with the digital images, which can be taken from the slides and other clinical information for making his or her diagnosis.

Using a suitable dissection technique, for example, microdissection by laser, one or several small tissue samples can be cut out of a slice being carried by the substrate of the slide. The small tissue samples can be subject to further molecular testing, such as DNA genotyping or RNA transcript profiling. Typically, the pathologist selects one or several regions of interest at the slice, which may be subject to be the previously explained dissection technique. Often, this selection is made by marking on the backside of the slide. An operator can then use a focused laser beam for cutting along a line of the marking that separates the region of interest and the surrounding tissue sample area. The separated tissue sample is then extracted for being subject for further molecular diagnostics.

The US 2012/0045790 A1 relates to a micro-dissection method and an information processing system. To facilitate the steps of selecting of a region of interest in the biological material sample and extracting a tissue sample at the region of interest, a determination of a region of interest in a sample slice on the basis on a region of interest in a digital image is provided, wherein a sample tissue is extracted from the sample slice at the respective region of interest.

The practical handling of slices has shown that a slice may have more than one region of interest. Such regions of interest are typically spaced from each other. In order to identify the different regions of interest, annotations can be provided to the slide, in particular at the backside of the slide. Accordingly, an annotation associated with a region of interest may contain an identifier for identifying the region of interest. Further annotations may be provided to the slide, in particular comments with respect to the slice, percentage notes with respect to an estimation of tumor cells or any other information, which might be relevant in the context of the diagnostical information. Typically, the pathologist annotates the so-called reference slide, at which the at least one region of interest is marked. Further, so-called sample slides, each comprising a sample slice, are provided. Preferably, the reference slice of the reference slide and the sample slices of the sample slides are cut from the biological material, which may have a block form. The reference slice and the sample slices are typically sent to a laboratory where a technician usually manually identify based on the information of the reference slide a region at the at least one sample slide corresponding to the region of interest of the reference slide. Accordingly, there is a manual trace of annotations, when handling sample slides.

SUMMARY OF THE INVENTION

There may be a need to facilitate a transformation of information provided at the reference slide to a sample slide, wherein the reference slide and the sample slide contain slices of the same biological material block.

The object of the invention is solved by the subject-matter of the independent claims, wherein further embodiments are incorporated in the dependent claims.

According to a first aspect of the invention, an apparatus is provided, comprising a reference providing unit, a sample providing unit, a recognition unit, a determination unit and an illustration unit. The reference providing unit is configured to provide a digital reference image of a reference slide comprising a reference slice of an object comprising biological material and to provide a digital annotation in the reference image. The sample providing unit is configured to provide a digital sample image of a sample slide comprising a sample slice of the object. The recognition unit is configured to perform a recognition between the reference image and the sample image to provide a spatial link between the reference image and the sample image. The determination unit is configured to determine on the basis of the spatial link an annotation position for the annotation at the sample slide. The illustration unit is configured to illustrate the annotation physically at the annotation position at the sample slide.

To facilitate the handling of a sample slide and/or a dissection of a sample tissue of a sample slice carried by the sample slide, the apparatus provides the advantage that the related annotation visually appear directly on the slide, wherein the arrangement of the annotation at the sample slide corresponds to the arrangement of the annotation at the reference slide. Accordingly, associations with respect to a shape of the slide, or any other features of the slide, in particular with a region of interest, can be maintained. For example, in case an annotation has been arranged close to a region of interest at the reference slide in order to achieve an association between the region of interest and the annotation, the respective annotation can be provided at the sample slide in an analogous arrangement. In case the region of interest is also provided to the sample slide, the close arrangement can appear, too. In particular, one can identify a desired association between the annotation and the region of interest by the annotation. Accordingly, a dissection of a sample tissue from the sample slice of the sample slide is simplified, since the technician can easily identify the desired region of interest. Furthermore, the annotation can be used for verification purpose.

In an example, the apparatus relates to an apparatus for diagnostics, in particular for molecular diagnostics, preferably in the field of biology, histology and/or pathology.

In a further example, the apparatus is used for or with a microscope.

The object comprising biological material relates to a sample of biological material, in particular forming a block of material. Hence, the "object" can also be referred to as "object-sample", "material-sample" or "object-block".

The term "slice" relates to a piece of sample material of the object, in particular as a cut from the object in form of a preferably thin (for example about 5 μm) slice.

In an example, a slide relates to a carrier provided for supporting and/or carrying a slice, in particular for diagnostic purposes. The slide can also be configured for archiving purposes, in particular for storing the slice.

In an example, the term "spatial link" refers to a transformation rule between features of the reference image and features of the sample image.

In an example, the digital reference image refers to a digital image of the reference slide carrying the reference slice.

In an example, the digital sample image refers to a digital image of the sample slide carrying the sample slice.

In an example, the annotation relates to at least one of a note, a marking, a text, a script, a drawing, a sign, a figure, a symbol and/or an icon.

In an example, the term "illustrate the annotation physically" relates to an actual or real appearance of the annotation.

According to an exemplary embodiment, the reference slice is a stained slice of the object, and the sample slice is an unstained or differently stained slice of the object.

The term "stained" relates to a coloration. Staining may increase the contrast of a slice and/or highlights particular features of interest of a slice.

The term "unstained" relates to a slice, which has not been employed by a chemical interaction with a staining substance.

The term "differently stained" relates to a different chemical staining substance used for staining. For example, an H&E-stained slice and an H-stained slice are differently stained.

In case the sample slice is unstained or differently stained, relevant cells or relevant parts of the sample slice may not be visible. But by illustrating the annotation physically on the sample slide, and thus in particular directly on the sample slice, the information provided with the annotation will facilitate the handling of the sample slide. In an example, the illustration may help to identify relevant regions of the sample slide or the sample slice. In a further example, the illustration of the annotation may provide relevant information associated with a region of interest of the sample slice.

According to an exemplary embodiment, the illustration unit is further configured to illustrate the annotation physically at the sample slice of the sample slide.

As a result, the annotation can visibly appear directly on the sample slice. This may facilitates a dissection of a sample tissue of the sample slice.

According to an exemplary embodiment, the illustration unit comprises a projector or a display to project light onto the sample slide for visually illustrating the annotation and/or a removing region.

As a result, the annotation can visibly appear directly on the sample slice without changing the condition of the sample slide or sample slice. Accordingly, a conditionally unchanged sample tissue can be dissected from the sample slice.

According to an exemplary embodiment, the illustration unit comprises an ink depositing unit to deposit ink at the sample slide for physically illustrating the annotation at the sample slide and/or the removing region at the sample slide.

As a result, the annotation can visibly appear directly on the sample slice. When moving the sample slice after the ink has been deposited, the annotation maintain at the sample slide. This maintenance facilitates the quality of dissection of a sample tissue of the sample slice, as the dissection may be performed by scraping. Displacements while scraping the sample tissue will not change a position of the annotation at the sample slide.

According to a second aspect of the invention, a system is provided that comprises a slide-image generation apparatus, and an apparatus according to one of the previous examples. The slide-image generation apparatus is configured to generate the digital reference image of the reference slide, and to generate the digital sample image of the sample slide.

As a result, the system may automatically copy an annotation of the reference slide to a sample slide.

According to a third aspect of the invention, an annotation-illustration method is provided. The method comprises the following steps:

a) providing a digital reference image for a reference slide comprising a reference slice of an object comprising biological material, b) providing a digital annotation in the reference image, c) providing a sample image of a sample slide comprising a sample slice of the object, d) performing a recognition between the reference image and the sample image to provide a spatial link between the reference image and the sample image, e) determining on the basis of the spatial link an annotation position for the annotation at the sample slide, and f) illustrating the annotation physically at the annotation position at the sample slide.

As a result, the annotation of the reference slide can be copied to the at least one sample slide. In case several sample slides are provides, the annotation of the reference slide can be copied to each of the sample slides. Accordingly, the method reduces the effort of annotating sample slides and increases the accuracy of an annotation at a sample slide.

In an exemplary embodiment, the illustration step f) comprises: illustrating the annotation physically at the sample slice of the sample slide.

As a result, a dissection of a sample tissue of the sample slice may be facilitated.

According to a fourth aspect of the invention, a computer program element for controlling a device according to one of the preceding examples is provided, which, when being executed by a processing unit, is adapted to perform one of the method steps according to one of the preceding examples.

According to a fifth aspect of the invention, a computer-readable medium is provided, having stored a program element according to the preceding aspect of the invention.

According to a sixth aspect of the invention, a slide for holding a sample slice is provided, comprising a support structure for carrying a sample slice, and a computer-readable medium having stored an annotation and/or a removing region at the sample slice.

According to an aspect of the invention, an annotation-illustration method is provided. It is the intention for the method to copy an annotation provided at a reference slide to a sample slide. Typically, a reference image of the reference slide is provided, in particular by scanning the reference slide. The reference image therefore has the information about the reference slice which is carried by the reference slide. Furthermore, the reference slide has been marked with a region of interest and an annotation, which can be associated with the region of interest. If such reference slide is scanned, the respective reference image contains the information about the marked region of interest as well as the annotation, too. Furthermore, a sample slide carrying a sample slice can be scanned, in order to provide a sample image. The sample slice and the reference slice are cut from the same object of a biological material. In particular, the sample slice has been cut directly after a cut of a material block has been preformed to provide the reference slice. Since the reference slice and the sample slice are from the same object, their features are very likely similar. Due to their similar features, an image recognition can be performed to obtain a transformation rule between the reference image and the sample image. It is preferred, that the transformation rule forms the spatial link between the reference slide and the sample slide. On the basis of the spatial link, any position information of a pixel, a feature or any point in the reference image can be transformed to a corresponding position at the sample image. Accordingly, it is preferred to determine an annotation position at the sample image, where the same annotation provided in the reference image can be copied to the sample image. Thus, the annotation position at the sample image is the position, where the annotation is desired to be at the sample slide. Accordingly, by determining the annotation position at the sample image, also the annotation position at the sample slide is determined. On the basis of the determined annotation position, the annotation, in particular a text or any other sign, color, or texture known from the reference image, is physically applied to the sample slide. For instance, the annotation can be directly applied to the sample slide by a light projection of a projector. Alternatively, the annotation can be printed with ink directly on the sample slide, in particular on the sample slice of the sample slide.

These and other aspects of the invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
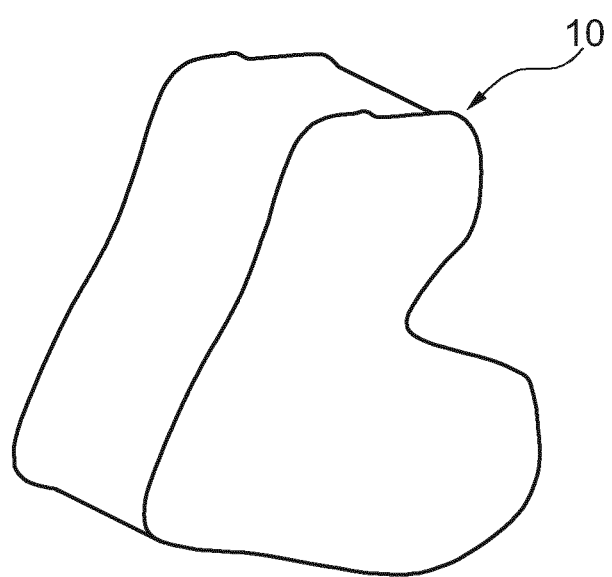
FIG. 1 shows schematically an object-block.

Unless specified otherwise, identical or similar reference numerals appearing in different figures label identical or similar components.

The present invention relates to the illumination of an annotation at a sample slide. The illumination of the annotation can increase the efficiency and/or quality of a workflow that enables the analysis in the field of digital pathology, in particular with molecular diagnostics. A respective analysis can be difficult and may require detailed analysis of the fine structure of biological material, in particular of cells and/or their morphology. Accordingly, a classification of the tissue into a normal type and tumor type can be as difficult. An illumination of an annotation at a sample slide may accelerate the performance of the workflow.

FIG. shows an example of an object 10.

The object 10 comprises biological material. In an example, the object 10 relates to a sample of biological material, in particular forming a block of biological material.

Hence, the object 10 can also be referred as to "object-sample", "material-sample" or "object-block".

In an example, a series of slices 16, 18 are cut of the object 10. One of these slices is preferably stained, in particular with Hematoxylin and Eosin (H&E). Generally, different substances for staining can be used.

In an example, staining a slice allows to distinguish for instance between cells, tissue and interconnections, in particular between muscle fibers, connective tissue, blood cells and/or organelles within individual cells.

In an example, the term "stain" relates to a coloration. Accordingly, staining preferably increases the contrast of a biological material of a slice and/or preferably highlights for instance particular features of interest of a biological material of a slice.

Figure 2:
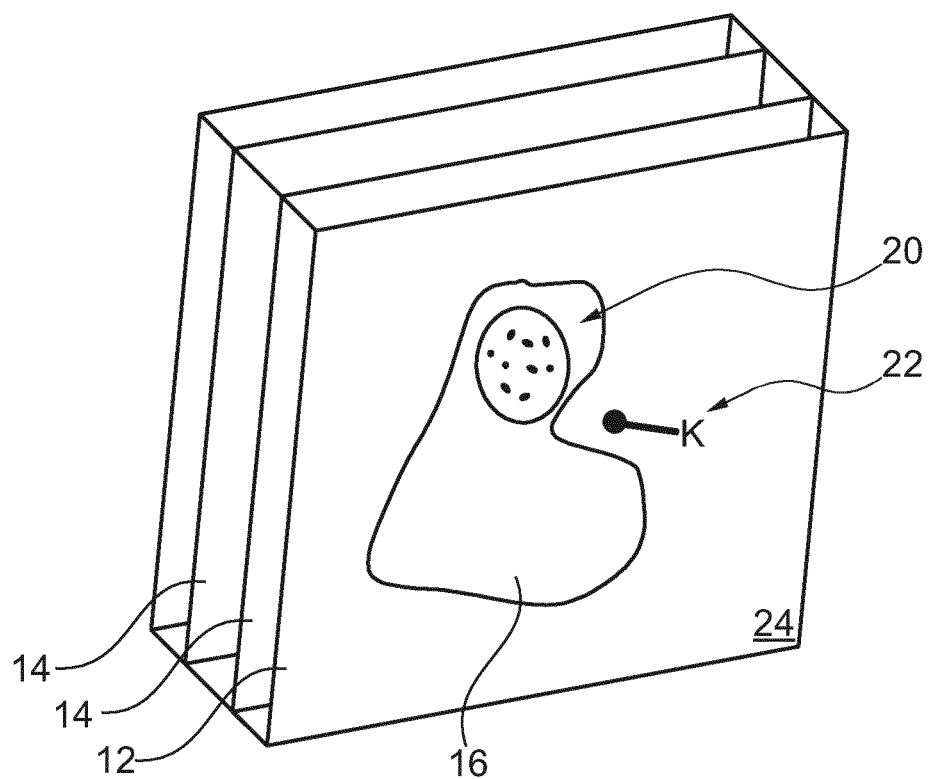
FIG. 2 shows schematically a series of slides.

In FIG. 2, a series of slides 12, 14 is shown. In front of the series, an example of a reference slide 12 is arranged. Behind the reference slide 12, examples of sample slides 14 are arranged.

The reference slide 12 comprises a reference slice 16 of the object 10. Each of the sample slides 14 comprises an associated sample slice 18 (not shown). The slices 16, 18 are preferably cut one after the other from the object 10. Accordingly, they may have a similar shape or pattern.

After analyzing the sample slice 16 of the sample slide 12, a region of interest 20 at the sample slice 12 may be identified. A region of interest 20 can be circled at the reference slice 16. In particular, the marking of the region of interest 20 can be performed by a pathologist. In an example, the region of interest 20 relates to an area of the reference slice 16, where particular cells, for instance tumor cells, are estimated.

Furthermore, an annotation 22 can be applied to the reference slide 12.

In an example, a slide 12, 14 relates to a carrier provided for supporting and/or carrying a slice 16, 18 for diagnostic purposes, in particular also for archive purposes for storing the slice 16, 18.

In a further example, a slide 12, 14 comprises a transparent substrate 24, for instance a glass substrate 24, on which a slice 16, 18 can be provided.

In an example, a cover slip (not shown), for example a thin glass layer or a transparent plate, may be provided on top of a slice 16, 18 and the substrate 24 to protect and/or hold the slice 16, 18.

In an example, an annotation 22 can be applied to a back surface of the transparent substrate 24 of the reference slide 12. In particular, a pathologist can use a pen, to apply an annotation 22 to the backside of the substrate 24. Alternatively, the annotation 22 can be applied to a front side of the reference slide 12. For example, the annotation 22 can be applied to the front side of the transparent substrate 24 of the reference slide 12 and/or to the cover slip of the reference slide 12.

In an example, the annotation 22 relates to at least one of a note, a marking, a text, a script, a drawing, a sign, a figure, a symbol and/or an icon.

In an example, the annotation may relate to a region of interest 20. In an alternative example, the annotation may not relate to or may not mark a region of interest 20, in particular an area, where tumor cells are estimated In an example, the region of interest 20 relates to a region of a slice 12, 14, which is supposed to be removed for further purposes, for instance, forming a tissue to be analyzed.

In an example, the term "region of interest" can be referred to as a "removing region".

Referring to FIG. 1, slices, in particular the reference slice 16 and/or the sample slice 18, may be cut one by one after another of the object 10. Accordingly, the slices 16, 18 may have a similar shape or pattern.

In an example, the reference slice 16 and the sample slice 18 were adjacent before being cut from the same object 10.

Figure 3:
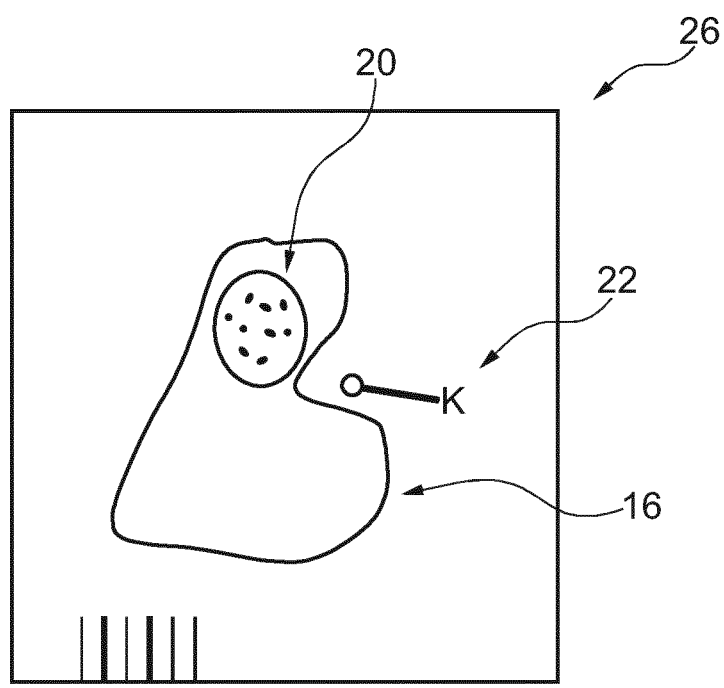
FIG. 3 shows an example of a reference image.

FIG. 3 shows a reference image 26 of the reference slide 12.

The reference image 26 shows preferably a top view of the reference slide 12. Accordingly, the reference image 26 comprises in part an image of the reference slice 16. Furthermore, the reference image 26 comprises the annotation 22 in digital form. Accordingly, the reference image 26 comprises the digital annotation 22.

In an example, the reference image 26 shows a region circled corresponding to the region of interest 20. Accordingly, the reference image 26 may comprise a digital region of interest 20.

In an example, reference slice 16 is stained, in particular when the reference image 26 is generated.

In an example, a pathologist digitally selects a region of interest 20 at the reference image 26.

In an example, the region of interest 20 at the reference image 26 is based on a morphology or a staining pattern of the reference slice 16.

Figure 4:
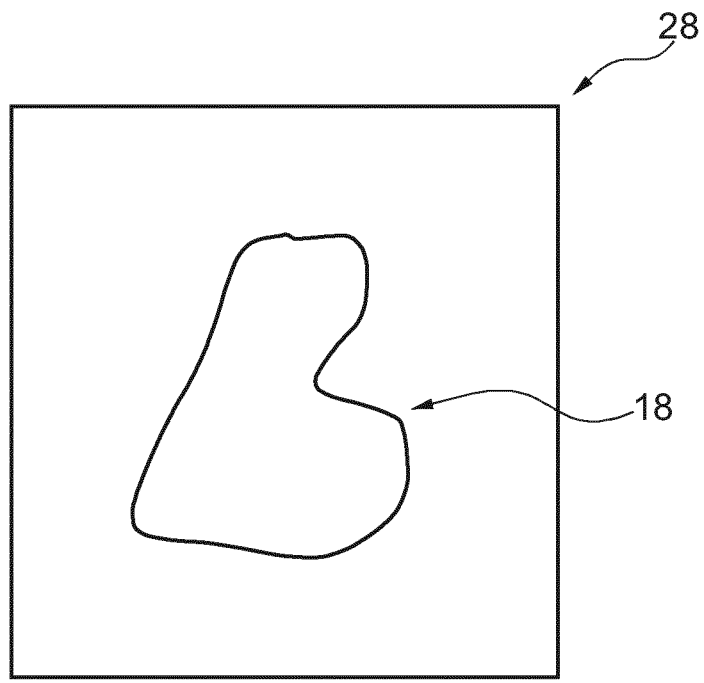
FIG. 4 shows an example of the sample image.

FIG. 4 shows an example of the sample image 28 of the sample slide 14.

The sample image 28 preferably relates to a top view of the sample slide 14.

In an example, the sample slide 14 comprises a transparent substrate 30, which carries a sample slice 18.

In an example, the sample slice 18 is unstained and/or paraffinized, in particular when the sample image 28 is generated.

Figure 5:
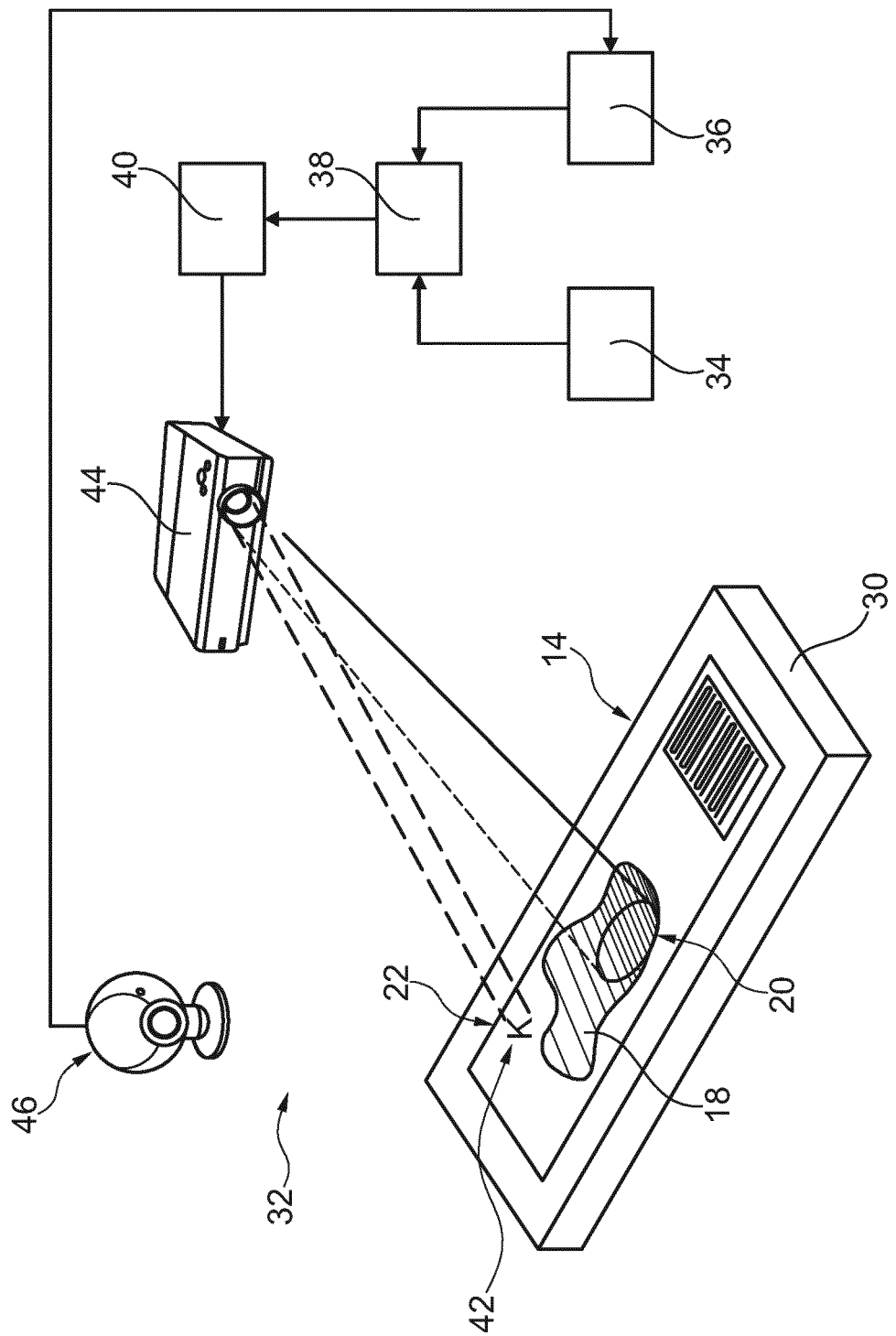
FIG. 5 shows a schematic setup of a first example of an apparatus according to the invention.

FIG. 5 shows a first example of the apparatus 32 according to an embodiment of the present invention. The apparatus 32 comprises a reference providing unit 34, a sample providing unit 36, a recognition unit 38, a determination unit 40, and an illustration unit 44.

The reference providing unit 34 is configured to provide a digital reference image 26 of a reference slide 12 comprising a reference slice 16 of an object 10 comprising biological material and to provide a digital annotation 22 in the reference image 26.

The term "digital reference image" also refers to as "reference image".

The term "digital annotation" can also be referred to as "annotation".

The sample providing unit 36 is configured to provide a digital sample image 28 of a sample slide 14 comprising a sample slice 18 of the object 10.

The term "digital sample image" can also be referred to as "sample image".

The recognition unit 38 is configured to perform a recognition between the reference image 26 and the sample image 28 to provide a spatial link between the reference image 26 and the sample image 28.

The determination unit 40 is configured to determine on the basis of the spatial link an annotation position 42 of the annotation 22 at the sample slide 14.

The illustration unit 44 is configured to illustrate the annotation 22 physically at the annotation position 42 at the sample slide 14.

As a result, the annotation can visibly appear directly at the sample slide 14. This appearance facilitates the handling of a sample slide 14, since a person handling the sample slide 14 does not have the constantly check the annotation at the reference slide.

In an example, the annotation 22 at the sample slide 14 corresponds to the annotation 22 in the reference image 26. In particular, the annotation 22 at the sample slide 14 can be a visible and/or real copy of the digital annotation 22 of the reference image 26.

In an example, the determination unit 40 is configured to determine the annotation position 42 in at least two steps. In a first step of the at least two steps, the determination unit 40 may be configured to determine on the basis of the spatial link an annotation position for the annotation 22 at the sample image 28. The annotation 22 at the sample image 28 may be a digital copy of the digital annotation 22 in the reference image 26. In a second step of the at least two steps, the determination unit 40 may be configured to determine on the basis of the annotation position of the digital annotation 22 in the sample image 28 an annotation position 42 for the annotation 22 at the sample slide 14. The annotation 22 at the sample slide 14 may be a visible and/or real copy of the digital annotation 22 at the sample image 28.

In an example, the digital sample image 28 refers to a digital image of the sample slide 14 carrying the sample slice 18.

In an example, the reference providing unit 34 comprises an interface configured to receive a reference image 26 in digital form.

In an example, the sample providing unit 36 can be connected to a camera 46, wherein the camera 46 is adapted to generate a digital sample image 28 of the sample slide 14. The connection between the sample providing unit 36 and the camera 46 may be a data connection, configured to transmit the data of the digital sample image 28 of the camera 46 to the sample providing unit 36.

The camera 46 can be of a suitable kind configured to generate the digital sample image 28.

In an example, the digital sample image 2/refers to a digital image of the sample slide 14 carrying the sample slice 18.

In an example, the reference providing unit 34 comprises an interface configured to receive the digital reference image 26 in a digital form.

In an example, the reference providing unit 34 is connected to a camera (not shown). The connection may be a data connection for transmitting data corresponding to the digital reference image 26. The camera may be configured to generate a digital reference image 26.

In a further example, the reference providing unit 34 may be connected (not shown) to the same camera 46 as the sample providing unit 36.

In a further example, the reference providing unit 34 and the sample providing unit 36 are combined and/or formed by a common unit.

In a further example, the reference providing unit 36 and the sample providing unit 36 are the same unit, which can be called as "providing unit".

In an example, the recognition between the reference image 26 and the sample image 28 is provided by an image recognition or an image registration.

In an example, the reference slice 16 and the sample slice 18 are cut from the same object 10, in particular one after the other. Accordingly, it is very likely, that the reference slice 16 and the sample slice 18 have a similar shape, pattern and/or other features.

In an example, the recognition between the reference image 26 and the sample image 28 provides a transformation rule between features of the reference image 26 and the sample image 28. The features can relate to a shape of the respective slice 16, 18 and/or a pattern of the respective slices 16, 18.

In an example, the term "spatial link" refers to the transformation rule between features of the reference image 26 and the sample image 28.

In an example, the transformation rule provides the rule for transformation of a position at the reference image to a corresponding position at the sample image.

In an example, the spatial link can be applied to the digital annotation 22. Accordingly, the spatial link can be applied to a position of the digital annotation 22 in the reference image 26 to provide the annotation position 42 for a copy of the annotation 22 in the sample image 28. In an example, the determination unit 40 may be configured to determine the aforesaid step.

In an example, the determination unit 40 is configured to determine the annotation position of the annotation 22 in the sample image 28 based on the spatial link and configured to map the annotation position thereafter to the sample slide 14.

In an example, on the basis of the annotation position of the annotation 22 in the sample image 28, an annotation position 42 for the annotation 22 at the sample slide 14 is determined. The determination unit 40 can be configured to perform this determination.

In an example, the annotation position relates to a position at the sample image 28 for the annotation.

In an example, the annotation position 42 relates to a position at the sample slide 14 for illustrating the annotation 22.

In an example, the annotation position 42 relates to a position for illustrating the annotation on a surface of the sample slide 14 or of the sample slice 16 carried by the sample slide 14. In other words, the determination unit 40 can be configured to determine the annotation position 42 of the annotation 22 in the sample image 28 based on the spatial link and configured to map the annotation position 42 thereafter to the sample slide 14.

FIG. 5 shows a schematic setup of an example of an apparatus 32.

In an example, the illustration unit 44 shown in FIG. 5 is configured to illustrate the annotation 22 by a light projection at the annotation position 42 at the sample slide 14.

In an example, the term "at the sample slide" can also be referred to as "on the sample slide".

In an example, the illustration unit 44 is configured to illustrate the annotation 22 physically at the annotation position 42 on the sample slide 14. In particular, the annotation 22 is physically illustrated on a surface of the sample slide 14. The surface of the sample slide 14 can be formed at least partly by a surface of a substrate 30 of the sample slide 14 and/or at least in partly by a surface of the sample slice 18.

In an example, the illustration can be carried out with light and/or ink.

In an example, the term "at the sample slide" can also be referred as to "in the sample slide".

In an example, the illustration unit 44 is configured to illustrate the annotation 22 physically at the annotation position 42 in the sample slide 14.

In an example, the physically illustration of the annotation 22 can be in a substrate 30 of the sample slide 14 and/or in a sample slice 18 carried by the substrate 30 of the sample slide 14. Preferably, the substrate 30 of the sample slide 14 transparent.

In an example, the illustration unit 44 is configured to illustrate a region of interest 20 physically at the sample slide 14.

In an example, the reference slide 12 can be scanned to provide a digital image of the reference slide 12, wherein thereafter at least one annotation 22 can be digitally applied to the digital image of the reference slide 12, in order to form the digital reference image 26 of the reference slide 12 including its digital annotation 22.

In an example, the reference slide 12 comprises a substrate 24, in particular a transparent substrate 24, wherein the substrate 24 carries the reference slice 16. Further, the reference slide 12 can comprise a cover slip, which is arranged on top of the reference slice 16, such that the reference slice 16 is arranged between the substrate 24 and the cover slip.

In a further example, the sample slide 14 comprises a substrate 30, in particular a transparent substrate 30, wherein the substrate 30 carries the sample slice 18. It is preferred, that the sample slide 14 is coverless. Thus, the sample slide 14 may not have a cover slip for covering the sample slice 18. Without the cover slip, biological material of the sample slice 18 can easily be dissected for further analysis or other purposes.

The apparatus 32, and in particular the camera 46 of the apparatus 32, can be configured for generating digital sample images 28 of several sample slides 14.

In an example, the apparatus 32 can be configured to identify a reference slide 12 and/or a sample slide 14. This facilitates an allocation between a reference slide 12 and a sample slide 14, in particular in the case, where several sample slides 14 may be allocated to the same reference slide 12.

In an example, the reference slide 12 and the sample slide 14 comprises each a data carrier, for instance a barcode and/or an electronic storage medium, in particular an RFID chip.

In an example, a data carrier of the reference slide 12 and/or a data carries of the sample slide 14, respectively, may be used for identification purposes. For example, if a sample slide 14 is identified and may be allocated with a reference slide 12, the apparatus 32 can be configured to illustrate the annotation 22, which corresponds to the digital annotation 22 in the reference image 26 of the reference slide 12, physically at the annotation position 42 at the sample slide 14.

By using the apparatus 32, a technician, who wants to analyze at least a part of the biological material of the sample slice 18 of the sample slide 14, does not need to constantly check the reference slide 12 for the information provided on the reference slide 12, since the annotation 22 can be physically illustrated at the sample slide 14. Therefore, the technician does not need to switch back and forth from the reference slide 12 to the slide 14. Thereby, a possible error rate is significantly reduced during the workflow of analyzing biological material of the object 10, in particular of a sample slice 18.

In a further example, the reference slice 16 is a stained slice of the object 10, and the sample slice 18 is an unstained or differently stained slice of the object 10.

In an example, staining relates to a coloration of features of a slice. For example, staining can increase the contrast of a slice and/or highlights particular features of interest of a slice.

In an example, the reference slice 16 and/or the sample slice 18 can be formalin fixed paraffin embedded (FFPE).

In an example, Hematoxylin (H), Eosin (E) or a combination of Hematoxylin and Eosin (H&E) can be applied as a staining substance for staining a slice.

In an example, staining a slice allows to distinguish for instance between cells, tissue and interconnections, in particular between muscle fibers, connective tissue, blood cells, and/or organelles in individual cells.

In an example, staining may be caused by a chemical interaction between the biological material of a slice and a staining substance used for staining.

The term "unstained" relates to a slice, which has not been employed by a chemical interaction with a staining substance. Accordingly, the sample slice 18 may not have been applied to a chemical interaction with a staining substance.

The term "differently stained" may relate to a different chemical staining substance for the sample slice 18 as for staining the reference slice 16. For example, the reference slice 16 may be stained with Hematoxylin and Eosin (H&E) and the sample slide may be stained with Hematoxylin only, thus being H-stained. In this case, the reference slice 16 and the sample slice 18 are differently stained.

In an example, reference slice 16 is stained, such that a desired region of interest can be identified.

In an example, the region of interest, which may refer to a removing region, at the reference slice 16 is based on a morphology and/or a staining pattern of the reference slice 16.

In an example, a region of interest can be identified in the reference image 26, which is in particular a picture of the reference slide 12 comprising the stained reference slice 16.

Figure 6:
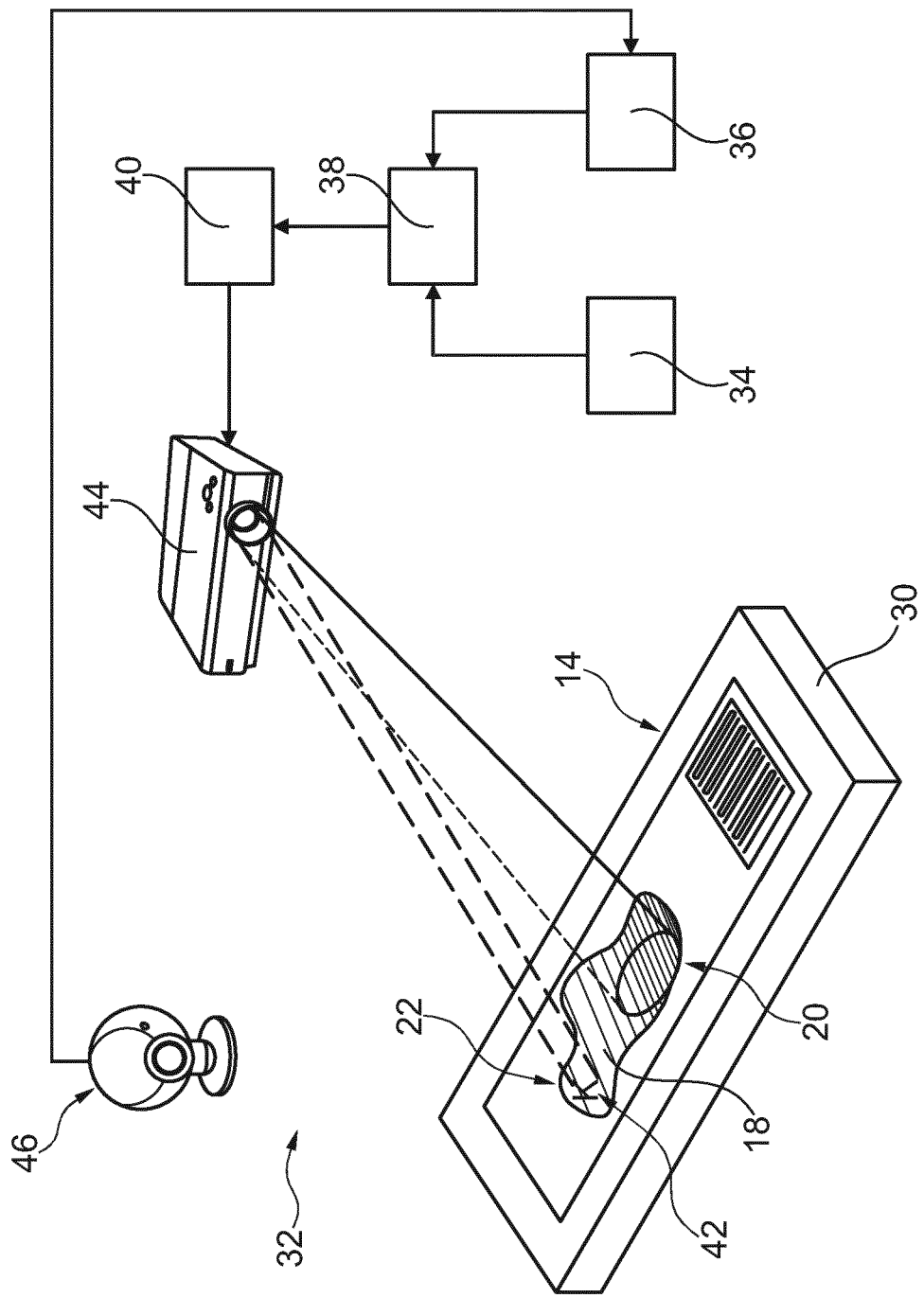
FIG. 6 shows a schematic setup of a second example of an apparatus according to the invention.

FIG. 6 shows a further example of the apparatus 32.

In an example, the illustration unit 44 is further configured to illustrate the annotation 22 physically at the sample position 42 at the sample slice 18 of the sample slide 14.

In an example, the term "at the slice" can also refer to as "on the slice". In particular, the annotation can be physically illustrated on a top surface of the sample slice 18.

In a further example, the term "at the slice" can also refer to as "in the slice".

In an example, the annotation 22 may be illuminated physically, and thus being illustrated physically, within the sample slice 18. This can be performed by an illustration unit 44 comprising a projector.

In an example, the illustration unit 44 can comprise a laser projector. The laser projector can be configures, such that a laser beam can illustrate the annotation 22 at the sample slice 18.

According to a further example, the recognition comprises an image recognition of features of the reference image 26 in the sample image 28.

Image recognition is generally known in the state of the art. The image recognition of the features of the reference image 26 in the sample image 28 may be performed to generate a transformation rule between features of the reference image 26 and respective features of the sample image 28.

According to a further example, the recognition comprises an image registration of the reference image 26 and the sample image 28 to provide a spatial link between registered features A, B, C, D of the reference image 26 and registered features A', B', C', D' of the sample image 28.

Figure 7:
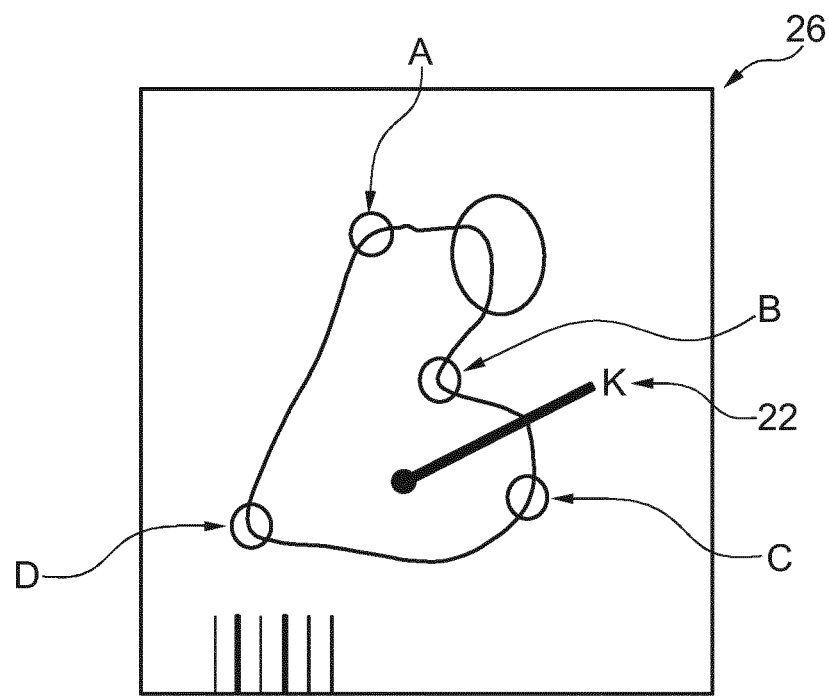
FIG. 7 shows a further example of a reference image.

The registered features A, B, C, D of the reference image 26 are exemplarily shown in FIG. 7.

Figure 8:
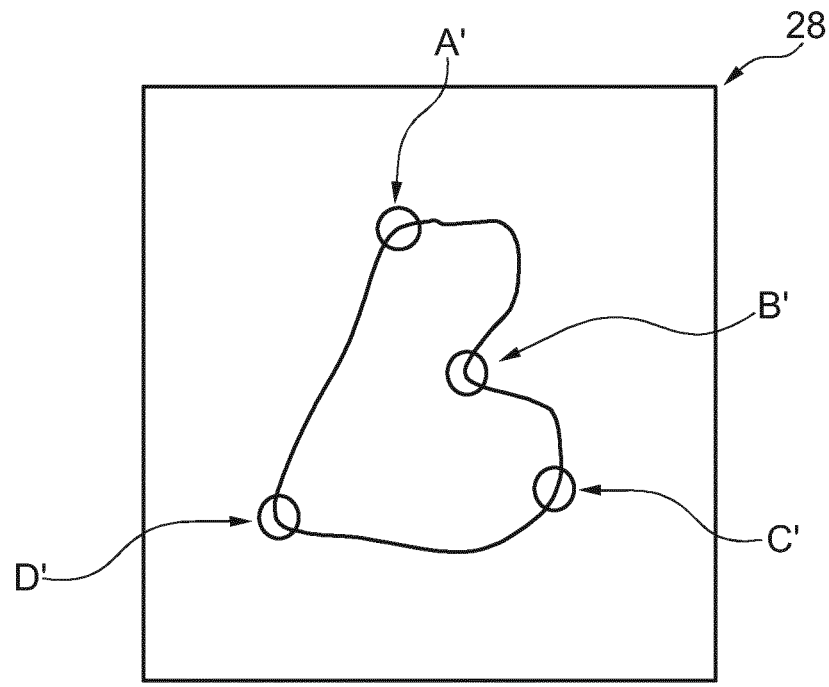
FIG. 8 shows a further example of a sample image.

The registered features A', B', C', D' of the sample image 28 are exemplarily shown in FIG. 8.

In an example, for the image registration, at least some features A, B, C, D of the reference image 26 project onto similar features A', B', C', D' of the sample image 28.

In an example, for the image registration, reference positions of the at least some features A, B, C, D of the reference image 26 and reference vectors to the reference positions are determined, sample positions of the at least some features A', B', C', D' of the sample image 28 and sample vectors to the sample positions are determined, and based on a match of the positions and the vectors, respectively, a spatial transformation rule as a spatial link is determined. Preferably, the determination unit 40 is configured to perform such determinations.

In another example, a contrast of a superposition of the reference image 26 and the image 28 is maximized, to determine a spatial transformation rule as the spatial link. Preferably, determination unit 40 can be configured to perform this determination.

In another example, the registration may comprise a wrapping of the reference image 26 to match the sample image 28, to determine spatial transformation rule as the spatial link. Preferably, the determination unit 40 can be configured to perform this determination.

In an example, the registration leads to a spatial matching of a reference frame of the reference image 26 with a sample frame of the sample image 28.

In an example, reference coordinates are determined for the reference slide 12, and reference coordinates are transferred to sample coordinates for the sample slide 14, in order to determine on the basis of the transformation a spatial link. Preferably, the determination unit 40 is configured to perform this determination.

According to a further example, the reference providing unit 34 is configured to provide a reference removing region in the reference image 26. In this case, the digital annotation 22 is preferably a digital note providing further information with respect to the reference removing region 48.

Figure 9:
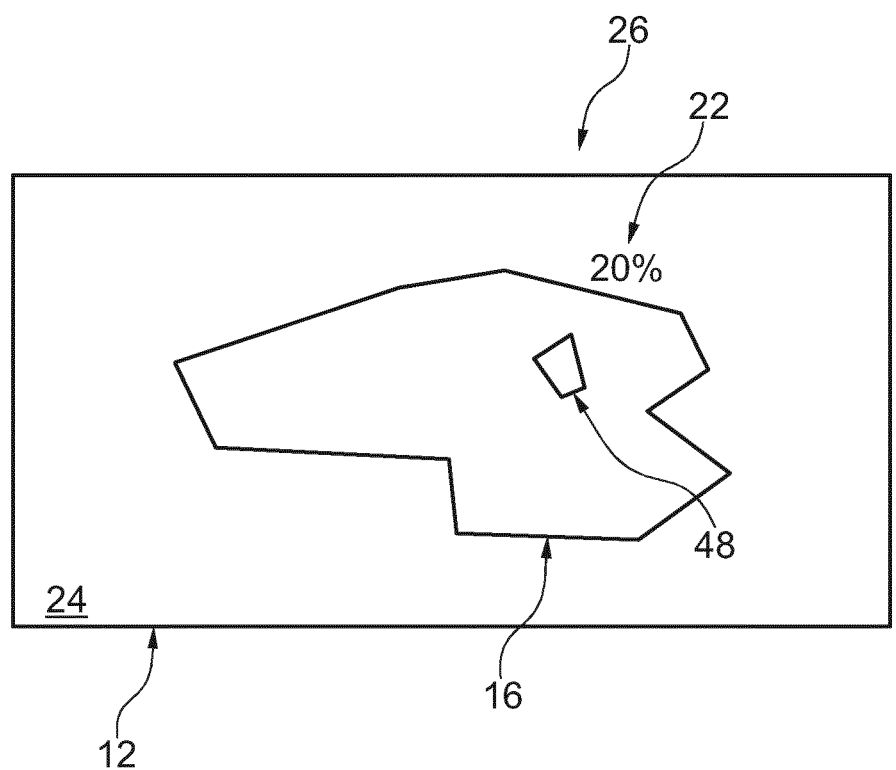
FIG. 9 shows a further example of a reference image.

In FIG. 9, a further example of the reference image 26 is provided. The reference image 26 corresponds to a picture of a top view of the reference slide 12. The reference slide 12 comprises a reference slice 16. Furthermore, a removing region 48 is shown.

In an example, the removing region 48 relates to a part of the reference slice 16.

In an example, the removing region 48 relates to a region in the reference image 26 or at the reference slice 16, which is supposed to be removed for further purposes, for instance forming a biological material tissue to be analyzed. Hence, the term "removing region" can be used instead.

As exemplary shown in FIG. 9, the term "20%" can corresponds to the digital annotation 22 and thus being a digital note. The digital note comprises further information with respect to the reference removing region 48. In particular, a pathologist has noted "20%" as a probability, that tumor cells are located at the removing region 48.

In an example, the digital annotation 22 can be outside of the reference slice 16, in particular on a top surface of a substrate 24 of the reference slide 12.

In an example, and in particular with respect to the afore explained context, the digital annotation 22 may not relate to a removing region 48. Preferably, the removing region 48 relates to an area in the reference image 26 picturing the reference slice 16. Further preferably, the digital annotation 22 is positioned in the reference image 26 at an area outside the area picturing the reference slice 16.

In an example, the digital note relates to at least one of a marking, a text, a script, a drawing, a color, a sign, a figure, a symbol and/or an icon.

In a further example, different colors can be used. For instance, different colors can be used to mark different areas at the sample slice. In embodiments one color of ink can be used to outline the tumor area of interest whereas a second color of ink can be used to mark a reference area of interest (e.g. healthy tissue).

According to a further example, the determination unit 40 is further configured to determine on the basis of the spatial link a removing position for removing region 48 at the sample slide 14.

In an example, the determination unit 40 is configured to determine on the basis of the spatial link a removing position for the removing region, which may be a copy of the reference removing region 48, at the sample image 28. Further preferred, the determination unit 40 can be configured to determine on the basis of the removing position at the sample image 28 a corresponding removing position for the removing region, at the sample slide 14.

In an example, the illustration unit 44 is further configured to illustrate the removing region 48, in particular the removing region corresponding to the removing region 48 in the reference image 26, physically at the removing position 50 at the sample slide 14.

Figure 10:
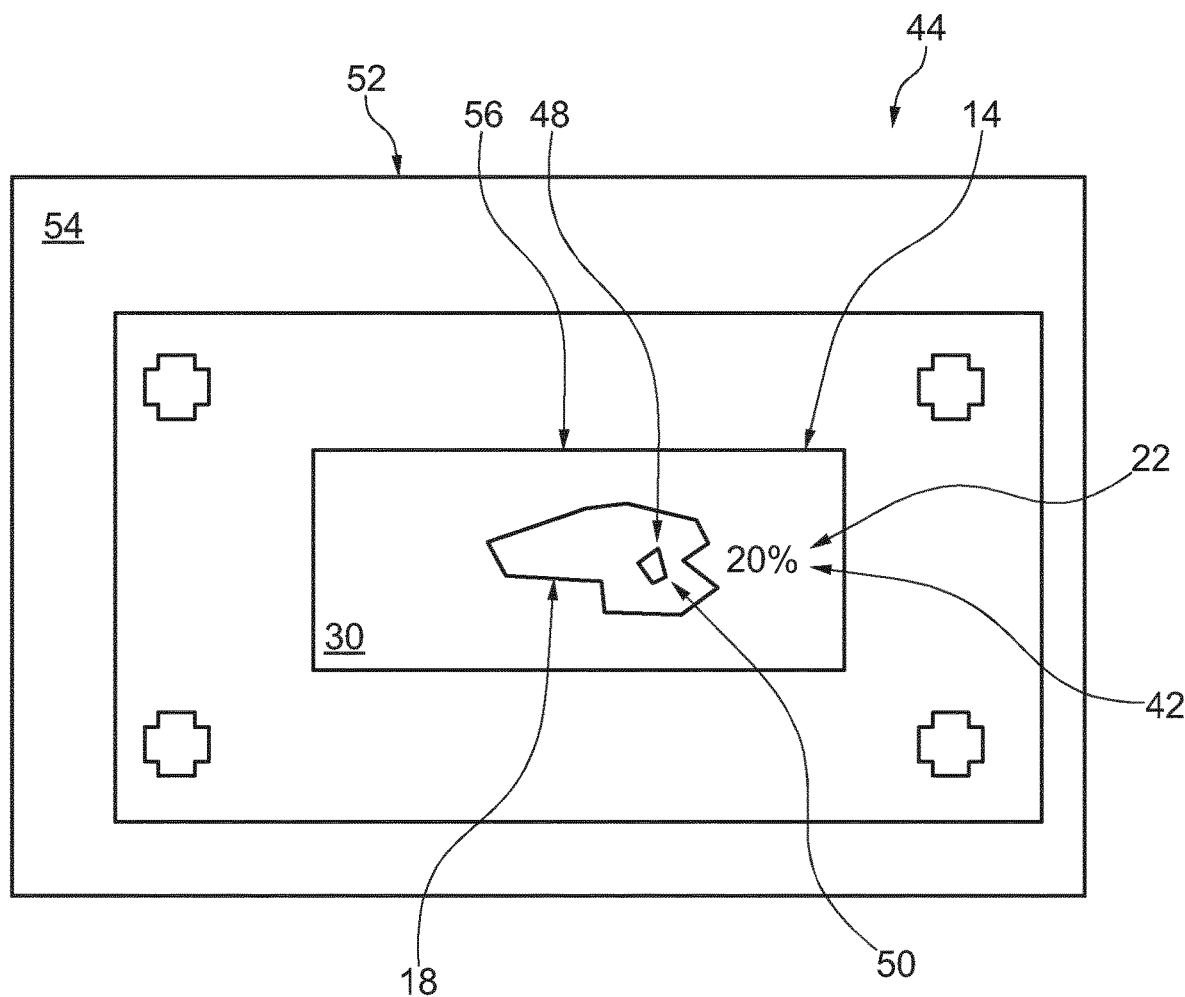
FIG. 10 shows schematically an example of a sample slice being arranged on a display.

FIG. 10 shows an example of a sample slice 18 being arranged on a display 52.

In an example, the illustration unit 44 comprises a display 52 to project light onto sample slide 14 for visually illustrating the annotation 22 and/or the removing region 48.

In an example, the display 52 may be formed as an LCD display.

In an example, the sample slide 14 is arranged on the display 52, in particular on a top surface 54 of the display 52. Alternatively, the sample slide 14 can be placed in front of the display 52, in particular of the top surface 54 of the display 52. The relative position between sample slide 14 and the display 52 can be fixed. In an example, the display 52 can highlight a region 56, where the slide 14 is to be arranged.

In a further example, the display 52 can project light on the sample slide 14, such that the annotation 22 and/or the removing region 48 are displayed in or on the sample slide 14. Preferably, the sample slice 18 is arranged on a transparent substrate 30 of the sample slide 14. The display 52 can therefore be configured to illuminate the annotation 22 and/or the removing region 48 at the sample slice 18.

In an example, the illustration unit 44 is configured to project light directly on the sample slide 14 or in the sample slice 18.

According to a further example, the illustration unit 44 comprises a projector to project light onto the sample slide 14 for visibly illustrating the annotation 22 or the removing region 48.

In a further example, the display 52 is arranged on a backside of the transparent substrate 30 of the sample slide 14.

In an example, the sample slide 14 is removably attached to the display 52. Thus, a mechanical alignment between the sample slide 14 and the display 52 can be achieved.

According to a further example, the illustration unit 44 comprises an ink depositing unit 58 to deposit ink at the sample slide 14 for physically illustrating the annotation 22 at sample slide 14 and/or for illustrating the removing region 50 of the sample slide 14.

Figure 11:
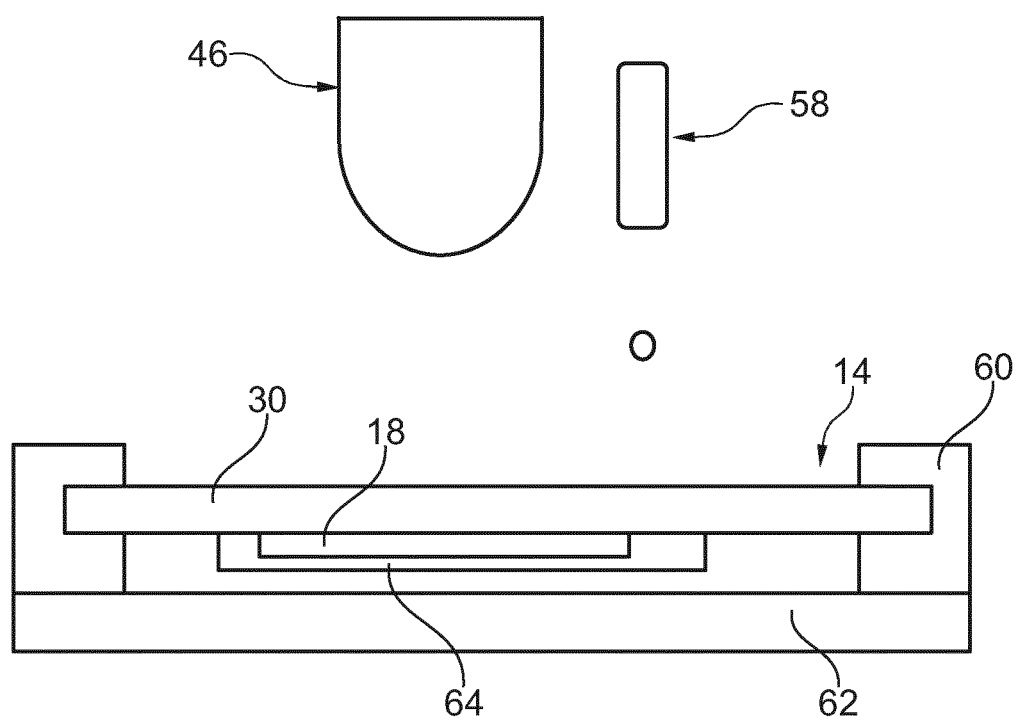
FIG. 11 shows a schematic setup of a third example of an apparatus according to the invention.

FIG. 11 shows a schematic setup of a further example of the apparatus 32.

The apparatus 32 may be used with a microscope (not shown). In an example, the apparatus 32 comprises a holder 60 for a slide 16, 18.

In an example, the slide holder 60 is configured for removably holding and/or carrying a sample slide 14.

In an example, the holder is stationary fixed with respect to the display 52 or the projector, respectively.

In an example, the illustration unit 44 comprises an ink depositing unit 58 to deposit ink at the sample slide 14 for physically illustrating the annotation 22 at sample slide 14 and/or for illustrating the removing region 50 of the sample slide 14.

In an example, the apparatus 32 comprises a backlight, which is arranged at a backside of the holder 60.

In an example, the ink depositing unit 58 is arranged at a top side of the holder 60. Accordingly, the holder 60 can be arranged between the ink depositing unit 58 and the backlight 62. In case the sample slide 14 is hold by the holder 60, the sample slide 14 can be arranged between the ink depositing unit 58 and the backlight 62.

In an example, a small slit is presented by the holder 60, in between the sample slide 14 can intervene.

In an example, the backlight is configured to provide illumination at a surface of the sample slide 14, in particular to the sample slice 18 carried by a transparent substrate 30 of the sample slide 14.

In an example, the sample slice 18 can be embedded with paraffin 64.

In an example, the ink depositing unit 58 is configured to deposit ink at the sample slide 14. Preferably, the ink is deposited, such that the annotation 22 is printed at an annotation position 42 at the sample slide 14.

In an example, the sample slide 14 is arranged at the holder 60, such that the sample slice 18 is arranged between the transparent substrate 30 of the sample slide 14 and the backlight 62. Accordingly, the ink depositing unit 58 is configured to print the annotation 22 on a backside of the substrate 30 of the sample slide 14. In other words, the illustration unit 44 can be configured to deposit ink on a surface of the sample slide 14 turned away from the sample slice 18.

Figure 12:
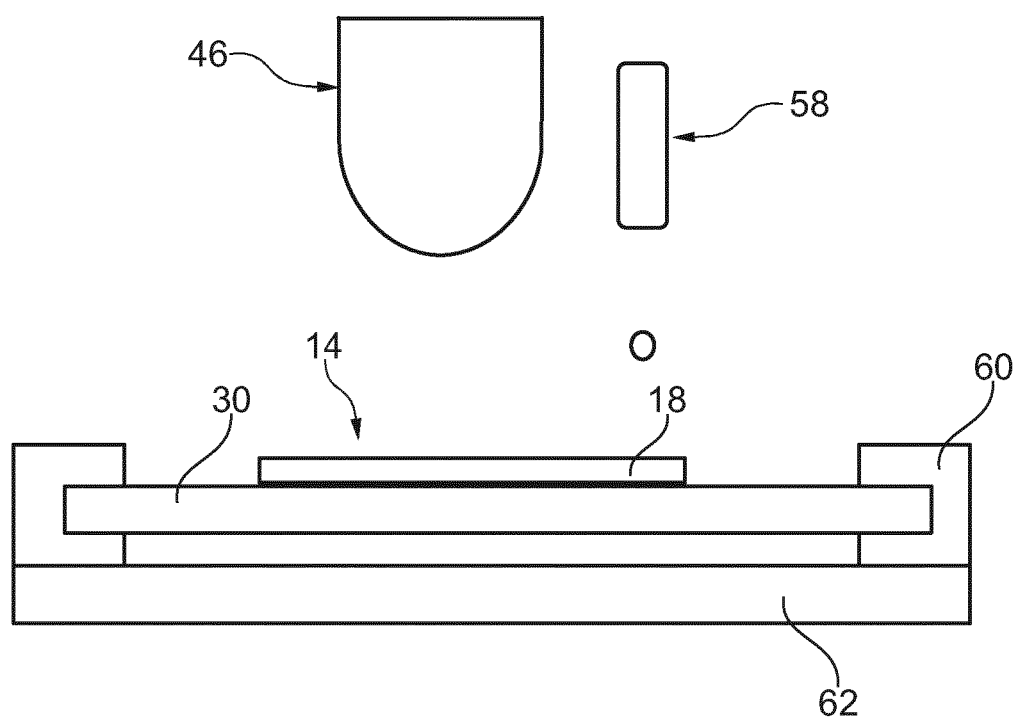
FIG. 12 shows a schematic setup of a fourth example of an apparatus according to the invention.

In FIG. 12 show a schematic setup of a further example of the apparatus 32. Reference is made with respect to the explanation to FIG. 11, except for those explanations, which refer to the orientation of the sample slide 14.

In an example, the sample slide 14 can be hold by the holder 60, such that the substrate 30 of the sample slide 14 is arranged between the sample slice 18 of the sample slide 14 and the backlight 62.

In an example, and in particular in the case de-paraffinized sample slides 14 are used, the ink can be deposited with the ink depositing unit 58 directly onto the sample slice 18.

Figure 13:
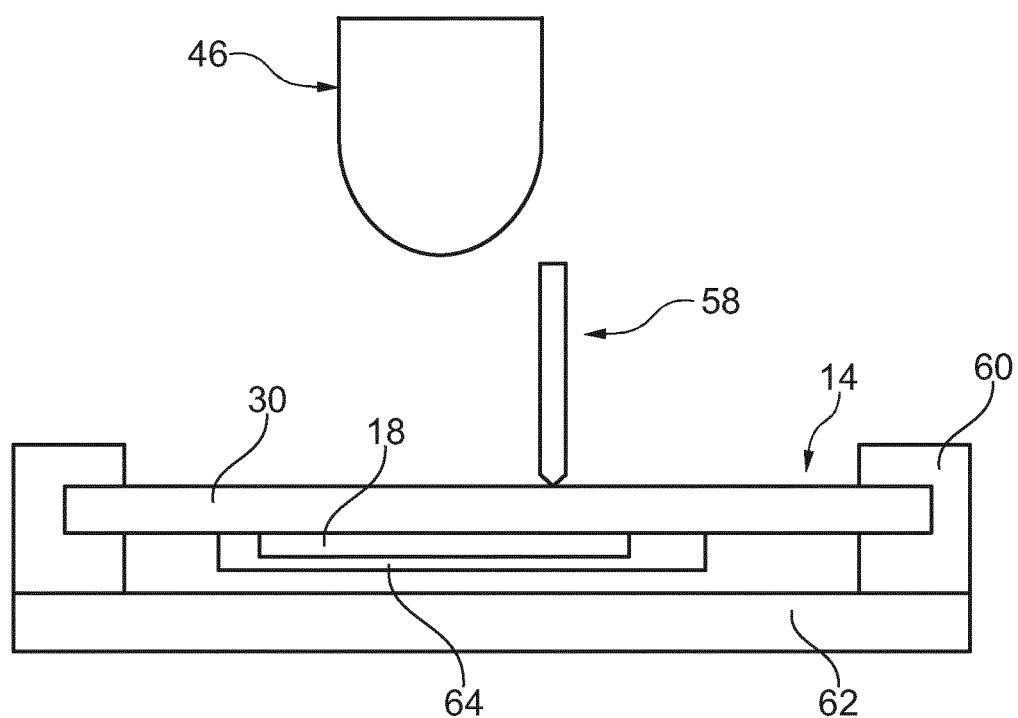
FIG. 13 shows a schematic setup of a fifth example of an apparatus according to the present invention.

FIG. 13 shows a schematic setup of a further example of the apparatus 32. Reference is made with respect to the explanation to FIG. 12, except for the ink depositing unit 58. In this case, the ink depositing 58 is a plotter with at least one pen.

In an example, the ink to be deposited with the ink depositing unit 58 can be performed by plotting with the pen. The plot can be applied directly to the sample slide 14.

In an example, the plot can be applied on a backside of a transparent substrate 30 of the sample slide 14. Alternatively, and according to a further example, the plot can be applied directly to the sample slice 18 of the sample slide 14.

According to a further example, a system is provided, comprising a slide-image generation apparatus, and an apparatus according to one of the preceding examples. The slide-image generation apparatus is preferably configured to generate the digital reference image 26 of the reference slide 12 and to generate the digital sample image 28 of the sample slide 14.

In an example, the slide-image generating apparatus is a camera 46.

In an example, the slide-image generating apparatus comprises a slide handling unit and the digital camera 46. The camera 46 can be configured for acquiring the digital image data of a slice temporarily hold the handling unit and provides data to a processing unit, for example formed by the reference providing unit 34 and/or the sample providing unit 36. The processing unit may also comprise the recognition unit 38 and/or the determination unit 40.

Figure 14:
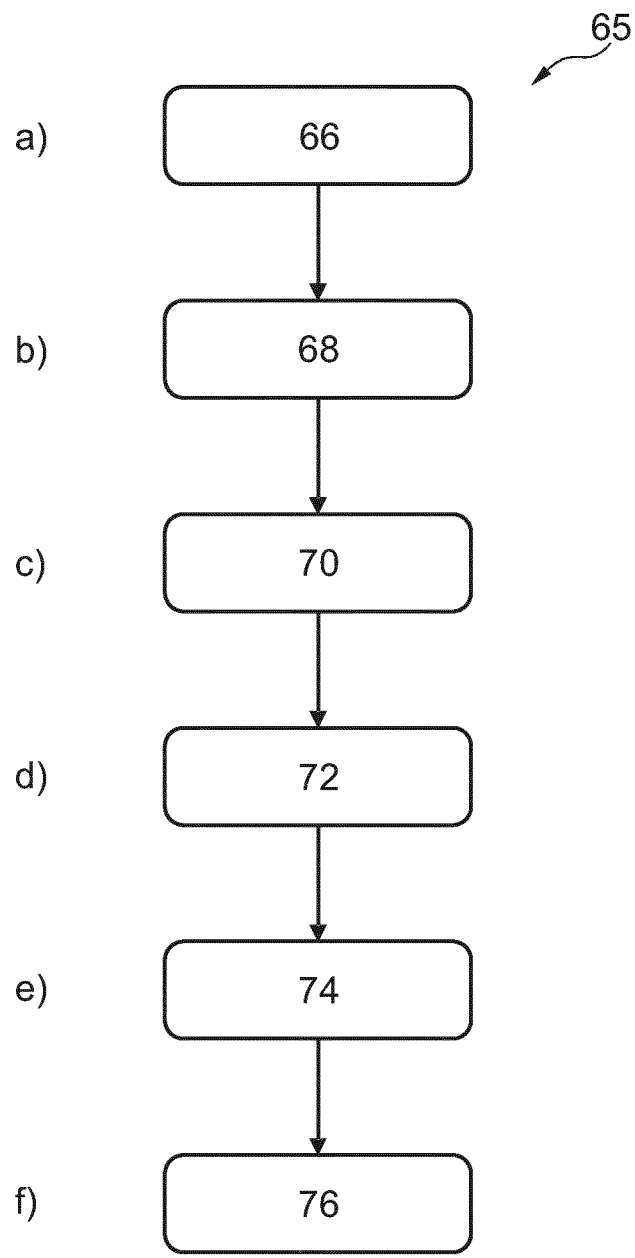
FIG. 14 shows a schematic flow-chart for an example of the method according to the present invention.

FIG. 14 shows a method 65 according to the present invention. The method 65 comprises the following:

In a first providing step 66, also referred to as step a), a digital reference image 26 of a reference slide 12 comprising a reference slice 16 of an object 10 comprising biological material is provided.

In a second providing step 68, also referred to as step b), a digital annotation 22 in the reference image 26 is provided.

In a third providing step 70, also referred to as step c), a sample image 28 of a sample slide 14 comprising a sample slice 18 of the object 10 is provided.

In a performing step 72, also referred to as step d), a recognition between the reference image 26 and the sample image 28 is performed, to provide a spatial link between the reference image 26 and the sample image 28.

In a determining step 74, also referred to as step e), on the basis of the spatial link, an annotation position 42 for the annotation 22 at the sample slide 14 is determined.

In an illustrating step 76, also referred to as step f), the annotation 22 is physically illustrated at the annotation position 42 at the sample slide 14.

According to an example, the illustration comprises illustrating the annotation 22 physically at the sample slice 18 of the sample slide 14.

In an example, the recognition comprises an image recognition of features of the reference image 26 and the sample image 28 and/or an image registration of the reference image 26 and the sample image 28, to provide the spatial link between registered features of the reference image 26 and registered features of the sample image.

In an example, wherein step b) comprises a sub-step b1) of providing a reference removing region 48 in the reference image, wherein the annotation 22 is a digital note providing further information with respect to the reference removing region 48.

In an example, wherein step e) comprises a sub-step e1) of determining on the basis of the spatial link a removing position 50 for the removing region 48 at the sample slide 14.

In an example, wherein step f) comprises a sub-step f1) of illustrating the removing region 50 physically at the removing position 50 at the sample slide 14.

In an example, the annotation 22 and/or the removing region 48 are illustrated at the sample slide 14 by projected light.

In an example, the light is directly projected on the sample slide or the sample slice.

In an example, a display 42, in particular a LCD display, or a projector is used for projecting light.

In an example, the illustrating of the annotation 22 comprises optically highlighting the annotation 22 at the sample slide 14 and/or at the sample slice 18.

In an example, the illustrating of the removing region 48 comprises optically highlighting the removing region 48 at the sample slide 14 and/or at the sample slice 18.

In an example, the annotation 22 is highlighted optically brighter or darker than a region bordering the annotation 22 at the sample slide 14 and/or at the sample slice 18.

In an example, the removing region 48 is highlighted optically brighter or darker than a region bordering the removing region 48 at the sample slide 14 and/or at the sample slice 18.

In an example, wherein step f) comprises depositing ink at the sample slide 14 for physically illustrating the annotation 22 at the sample slide 14 and/or the removing region 50 at the sample slide 14.

In an example, the sample slice 18 is provided by a transparent substrate 30 of the sample slide 14, wherein for illustrating the annotation 22, the annotation 22 is printed at a backside of the substrate 30.

In an example, the annotation 22 is printed outside the removing region 48.

In an example, for illustrating the removing region 48, the ink is deposited as a line circumscribing an area at the sample slide 14, which is in exact overlap with the removing region 48 at the sample slice 18.

In an example, the ink is deposited as a line circumscribing the removing region 50 on a surface of the sample slice 18.

In an example, wherein it is further provided: step g) removing at least a part of the biological material at the removing region 50 of the sample slice 18, and step h) providing the removed biological material for further purpose.

It has to be noted that embodiments of the invention are described with reference to different subject matters. In particular, some embodiments are described with reference to an apparatus whereas other embodiments are described with reference to the method. However, a person skilled in the art will gather from the above that, unless otherwise notified, in addition to any combination of features belonging to one subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single slice or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus comprising:
    a reference providing unit configured to provide a digital reference image of a reference slide comprising a reference slice of an object comprising biological material and to provide a digital annotation in the reference image;
    a sample providing unit configured to provide a digital sample image of a sample slide comprising a sample slice of the object, wherein the sample slice and the reference slice are cut from the same object;
    a recognition unit configured to perform a recognition between the reference image and the sample image to provide a spatial link between the reference image and the sample image;
    a determination unit configured to determine an annotation position for the annotation at the sample image based on the spatial link between the reference image and the sample image, and to map the annotation position for the annotation from the sample image to the sample slide; and
    an illustration unit configured to illustrate the annotation physically at the annotation position at the sample slide,
    wherein the illustration unit is further configured to deposit ink at the sample slide for physically illustrating the annotation at the sample slide,
    wherein the ink depositing unit is configured to print the annotation on a backside of a substrate of the sample slide.

2. The apparatus according to claim 1, wherein the reference slice is a stained slice of the object, and the sample slice is an unstained or differently stained slice of the object.

3. The apparatus according to claim 1, wherein the illustration unit is further configured to illustrate the annotation physically at the slice of the sample slide.

4. The apparatus according to claim 1, wherein performing the recognition comprises recognizing features of the reference image in the sample image, and/or registering the reference image and the sample image to provide the spatial link between registered features of the reference image and registered features of the sample image.

5. The apparatus according to claim 4, wherein the reference providing unit is further configured to provide a reference removing region at the reference image, wherein the reference annotation is a digital note providing further information with respect to the reference removing region.

6. The apparatus according to claim 5, wherein the determination unit is further configured to determine a removing position for the removing region at the sample slide by applying the spatial link to the removing region at the reference image; and the illustration unit is further configured to illustrate the removing region physically at the removing position at the sample slide.

7. The apparatus according to claim 1, wherein the illustration unit comprises a projector or a display to project light onto the sample slide for visually illustrating the annotation.

8. The apparatus according to claim 1, wherein the reference slide and/or the sample slide comprise a data carrier for slide identification purposes.

9. A system comprising:
    a slide-image generation apparatus; and
    the apparatus according to claim 8,
    wherein the slide-image generation apparatus is configured to generate the digital reference image of the reference slide, and to generate the digital sample image of the sample slide.

10. An annotation-illustration method, comprising the following steps:
    receiving a digital reference image of a reference slide comprising a reference slice of an object comprising biological material;
    receiving a digital annotation in the reference image;
    receiving a sample image of a sample slide comprising a sample slice of the object, wherein the sample slice and the reference slice are cut from the same object;
    performing a recognition between the reference image and the sample image to provide a spatial link between the reference image and the sample image;
    determining an annotation position for the annotation at the sample image based on the spatial link between the reference image and the sample image, and mapping the annotation position for the annotation from the sample image to the sample slide; and
    illustrating the digital annotation physically at the annotation position at the sample slide;
    depositing ink at the sample slide for physically illustrating the annotation at the sample slide including printing the annotation on a backside of a substrate of the sample slide.

11. The method according to claim 10, wherein illustrating the digital annotation comprises illustrating the digital annotation physically at the slice of the sample slide.

12. The apparatus according to claim 5, wherein the illustration unit comprises a projector or a display to project light onto the sample slide for visually illustrating the removing region.

13. The apparatus according to claim 5, wherein the illustration unit is further configured to deposit ink at the sample slide for physically illustrating the annotation at the removing region at the sample slide.

14. The method according to claim 10, wherein illustrating the digital annotation comprises projecting light onto the sample slide for visually illustrating the annotation at the sample slide.

15. The method according to claim 10, wherein illustrating the digital annotation comprises depositing ink onto the sample slide for visually illustrating the annotation at the sample slide.

16. A non-transitory computer readable medium having stored thereon software instructions that, when executed by a processor, cause the processor to perform a annotation-illustration method comprising:
- receiving a digital reference image of a reference slide comprising a reference slice of an object comprising biological material;
- receiving a digital annotation in the reference image;
- receiving a sample image of a sample slide comprising a sample slice of the object, wherein the sample slice and the reference slice are cut from the same object;
- performing a recognition between the reference image and the sample image to provide a spatial link between the reference image and the sample image;
- determining an annotation position for the annotation at the sample image based on the spatial link between the reference image and the sample image, and mapping the annotation position for the annotation from the sample image to the sample slide; and
- causing the digital annotation to be physically illustrated at the annotation position at the sample slide, wherein ink is deposited on a backside of a substrate of the sample slide.

* * * * *